United States Patent
Song et al.

(10) Patent No.: US 8,054,428 B2
(45) Date of Patent: *Nov. 8, 2011

(54) LIQUID CRYSTAL DISPLAY HAVING OPENINGS IN THE PROTECTIVE LAYER AND GATE INSULATING LAYER AND METHOD FOR FABRICATING THE DISPLAY

(75) Inventors: Jang-Kun Song, Seoul (KR); Sang-Gab Kim, Seoul (KR); Seung-Hee Lee, Chungcheongbuk-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,356

(22) Filed: Dec. 5, 2008

(65) Prior Publication Data

US 2009/0185116 A1 Jul. 23, 2009

Related U.S. Application Data

(63) Continuation of application No. 10/499,131, filed as application No. PCT/KR02/01390 on Jul. 24, 2002, now Pat. No. 7,463,321.

(30) Foreign Application Priority Data

Jan. 15, 2002 (KR) .................................. 2002-2229
May 9, 2002 (KR) ................................ 2002-25537

(51) Int. Cl.
*G02F 1/1337* (2006.01)
*G02F 1/136* (2006.01)
(52) U.S. Cl. .......... 349/129; 349/43; 349/114; 349/143; 349/146

(58) Field of Classification Search .................. 349/129, 349/43, 114, 143, 146
See application file for complete search history.

(56) References Cited

U.S. PATENT DOCUMENTS 6,809,787 B1 * 10/2004 Seo et al. ....................... 349/129
2002/0176034 A1 * 11/2002 Lee ................................ 349/43

FOREIGN PATENT DOCUMENTS

| JP | 62-223723 | 10/1987 |
| JP | 05-158019 | 6/1993 |
| JP | 06-011733 | 1/1994 |
| JP | 07-175050 | 7/1995 |
| JP | 09-160019 | 6/1997 |
| JP | 10-073716 | 3/1998 |
| JP | 2001-027754 | 1/2001 |

(Continued)

OTHER PUBLICATIONS

English Abstract for Publication No. 62-223723.

(Continued)

*Primary Examiner* — David Nelms
*Assistant Examiner* — Nathanael R Briggs
(74) *Attorney, Agent, or Firm* — F. Chau & Associates, LLC

(57) ABSTRACT

The present invention relates to a liquid crystal display and a fabricating method thereof. The cell gaps for the red, green and blue pixel areas are formed in a separate manner for correcting the color shift to enhance image quality. Openings for controlling the cell gaps are provided in the protective layer and the gate insulating layer and have a zigzag-shaped boundary. In this way, the light leakage near the boundary of the openings can be prevented.

11 Claims, 12 Drawing Sheets

FOREIGN PATENT DOCUMENTS

| | | |
|---|---|---|
| JP | 2001-109000 | 4/2001 |
| JP | 2002014333 A * | 1/2002 |
| KR | 09-080447 | 3/1997 |
| KR | 100357213 | 10/2002 |
| KR | 100357216 | 10/2002 |
| KR | 100654159 | 11/2006 |

OTHER PUBLICATIONS

English Abstract for Publication No. 10-073716.
English Abstract for Publication No. 06-011733.
English Abstract for Publication No. 100357213.
English Abstract for Publication No. 100357216.
English Abstract for Publication No. 100654159.
English Abstract for Publication No. 09080447.
English Abstract for Publication No. 07-175050.
English Abstract for Publication No. 05-158019.
English Abstract for Publication No. 2001-109000.
English Abstract for Publication No. 09-160019.
English Abstract for Publication No. 2001-027754.

* cited by examiner

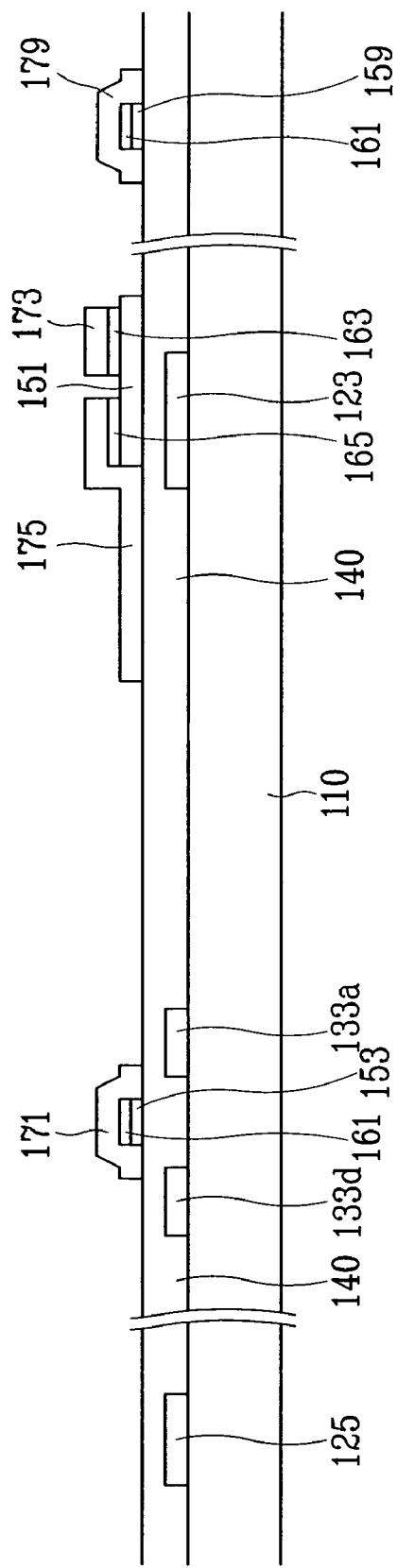

LIQUID CRYSTAL DISPLAY HAVING OPENINGS IN THE PROTECTIVE LAYER AND GATE INSULATING LAYER AND METHOD FOR FABRICATING THE DISPLAY

CROSS-REFERENCE TO RELATED APPLICATION

The present application is a continuation of U.S. patent application Ser. No. 10/499,131, filed Dec. 23, 2004 now U.S. Pat. No. 7,463,321, which is a National Stage filing under 35 U.S.C. §371 of International Patent Application PCT/KR02/01390, filed Jul. 24, 2002, which claims priority to Korean Patent Application No. 2002-2229, filed Jan. 15, 2002, and Korean Patent Application No. 2002-25537, filed May 9, 2002, the contents of which are herein incorporated by reference in their entirety.

BACKGROUND OF THE INVENTION

1. Technical Field

The present disclosure relates to a liquid crystal display and, more specifically, to a liquid crystal display having openings in the protective layer and gate insulating layer and a method for fabricating the same.

2. Discussion of Related Art

Generally, a liquid crystal display (LCD) has top and bottom panels with electrodes, and a liquid crystal material interposed between the two panels. Electric fields are applied to the liquid crystal material by means of the electrodes, and controlled in the strength to control the transmittance of light passing through the panels, thereby displaying the desired picture images.

Among the LCDs, has been now extensively used a display device having two panels respectively provided with a common electrode and a plurality of pixel electrode, and the panel with the pixel electrodes includes a plurality of thin film transistors (TFTs) for switching the voltage applied to the pixel electrodes.

In the LCD, the transmittance of blue light having short wavelength is high at low gray scales, while the transmittance of red and green lights becomes large as goes to higher gray compared with that of the blue light. Therefore, as it goes to higher gray, the component of yellow light, which is obtained by synthesizing red and green lights, becomes large to yield color shift such as so-called yellowish phenomenon and deterioration of image quality. Furthermore, the variation in the transmittance of lights with different wavelength depending on the viewing angle is not uniform. This also affects the color shift to deteriorate the image quality.

SUMMARY

It is a motivation of the present invention to enhance the image quality by correcting the color shift.

It is another motivation of the present invention to prevent increase in the light leakage due to the structural variation for the color shift correction.

These and other motivation may be realized by separately providing cell gaps for the red, green and blue pixel areas.

Specifically, a thin film transistor array panel for the liquid crystal display is provided, which includes a first insulating substrate; a plurality of gate lines formed on the first insulating substrate; a gate insulating layer covering the gate line; a plurality of data lines formed on the gate insulating layer and intersecting the gate lines to define first to third pixel areas; a plurality of thin film transistors electrically connected to the gate lines and the data lines; a protective layer covering the thin film transistors and the data lines and having a plurality of contact holes exposing a plurality of drain electrodes of the thin film transistors; and a plurality of pixel electrodes connected to the drain electrodes through the contact holes, wherein the protective layer and the gate insulating layer have openings in the first and the second pixel areas, and the openings overlap the pixel electrodes and have zigzag-shaped boundaries.

A portion of the gate insulating layer overlapping a semiconductor pattern may be thicker than other portions of the gate insulating layer. The pixel electrode may include a plurality of partitions by means of cutouts, and the openings may include a plurality of sub-portions overlapping the partitions of the pixel electrodes. The boundary of the opening may make angle of about zero degree, about 45 degrees, about 90 degrees and about 135 degrees with the gate lines.

A liquid crystal display including the thin film transistor array panel is provided, which includes a second insulating substrate facing the first insulating substrate; a black matrix formed on the second insulating substrate; red, green and blue color filters arranged in turn on the black matrix and the second insulating substrate and facing the first to the third pixel areas; and a common electrode covering the color filters.

One of the red, green and blue color filters may be thicker than the other color filters. The cell gaps D1, D2 and D3 in the first, the second and the third pixel areas may satisfy the relation, D1>D2>D3, or D1=D2>D3. An overcoat is formed between the common electrode and the color filters, and the common electrode may have a plurality of cutouts.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIGS. 6A to 6E are sectional views of the TFT array panel for the LCD according to the first and the second embodiments taken along the lines corresponding to the lines VI-VI', VI'-VI" and VI"-VI'" shown in FIG. 1, which sequentially illustrates the steps of fabricating the TFT array panel;

DETAILED DESCRIPTION OF THE DRAWINGS

Figure 1:
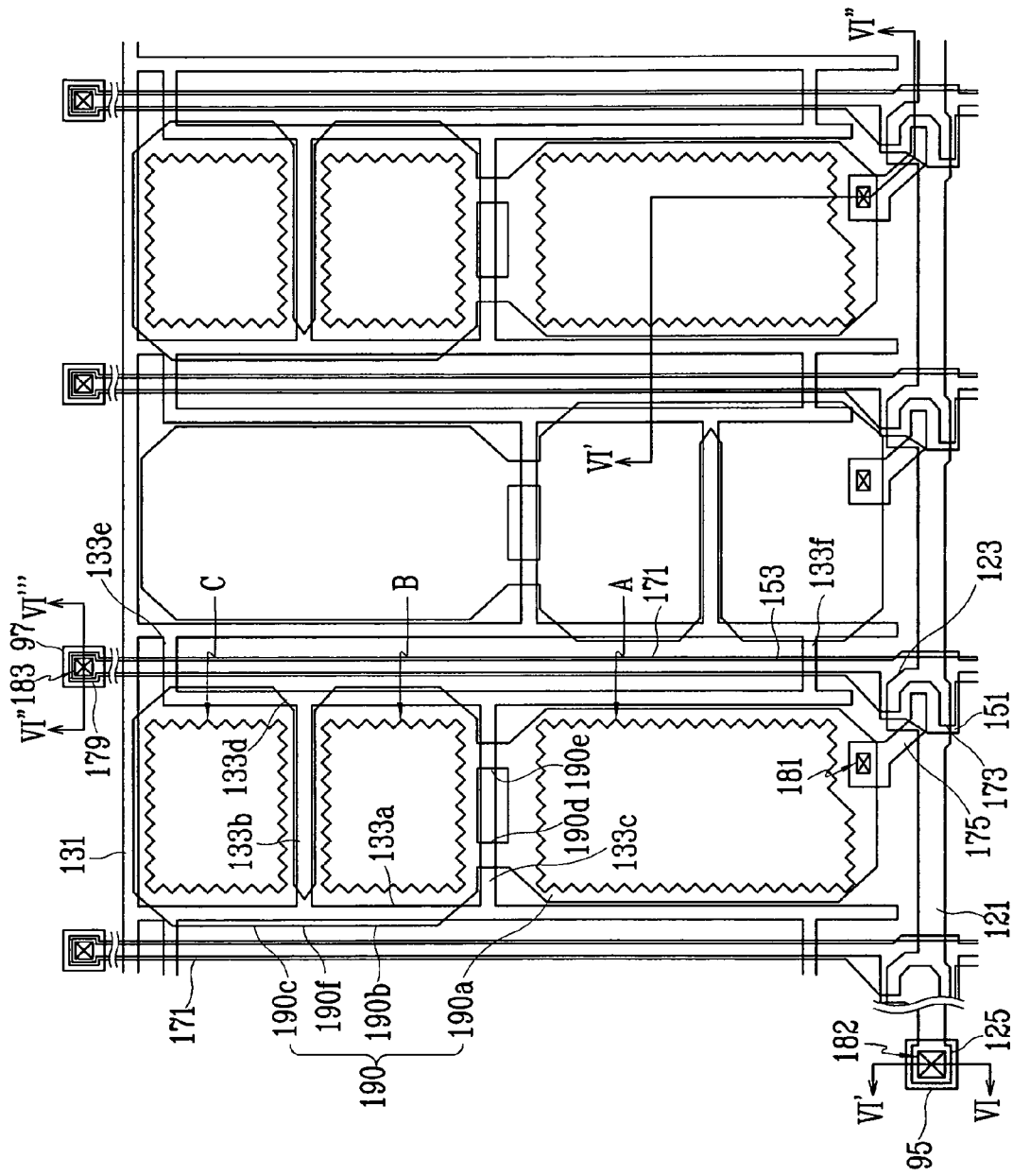
FIG. 1 is a layout view of a TFT array panel for a LCD according to a first embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

DESCRIPTION OF THE REFERENCE NUMERALS

121: Gate line,
171: Data line,
131: Storage electrode line,
133a, 133b, 133c, 133d, 133e, 133f: Storage electrode
190 (190a, 190b, 190c): Pixel electrode,
140: Gate insulating layer
180: Protective layer,
A, B, C: Opening
3: Liquid crystal layer,
220: Black matrix
230 (R, G, B): Color filter,
270: Common electrode,
270 271, 272, 273: Cutout The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, liquid crystal displays according to embodiments of the present invention will be described with reference to the drawings.

As described above, the color shift is generated since the variation in the transmittance of lights with different wavelengths is not uniform. Therefore, if the variation in the light transmittance is separately controlled for respective wavelengths, the desired color correction can be made to prohibit the color shift.

The light transmittance of an LCD depends upon the retardation $\Delta n \cdot d$ (where $\Delta n$ indicates a birefringence and d indicates a cell gap), and the light wavelength $\lambda$. That is, the light transmittance varies depending upon the retardation and the degree of the variation depends upon the light wavelength. The dependency of the light transmittance upon the retardation and the light wavelength can be discriminated from the following equation:

$$I = I_0 \sin^2 2\theta \sin^2\left(\frac{\pi d \Delta n}{\lambda}\right) \quad (1)$$

In the LCD, the birefringence $\Delta n$ in red, green and blue pixel regions is equal to each other since the pixel regions contain the same liquid crystal. Accordingly, only the cell gap can be used to separately control the light transmittance in the respective red, green and blue pixel regions. Therefore, the color shift problem due to the non-uniform variation in the transmittance of the red, the green and the blue lights can be compensated by determining the cell gap for respective pixel regions in a separate manner to individually control the light transmittance. The wavelength of the blue light is the shortest, that of the green light is the next, and that of the red light is the longest. In view of Equation 1, the cell gap, therefore, gradually increases from the blue region to the red region via the green region. That is, the cell gap is made as follows:

$$d_{blue} < d_{green} < d_{red} \quad (2)$$

Now, LCDs according to embodiments of the present invention are described in detail with reference to the drawings.

Figure 2:
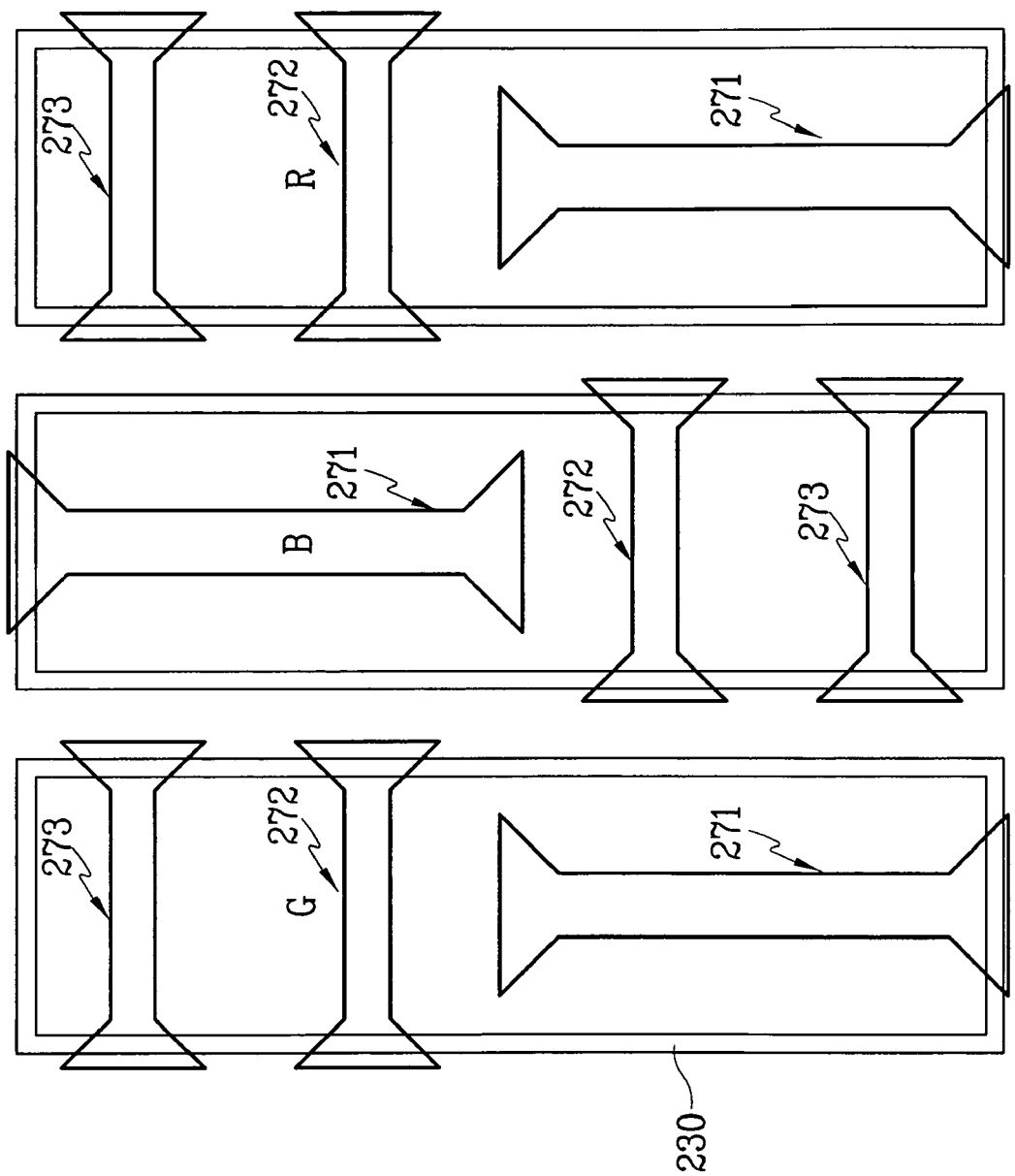
FIG. 2 is a layout view of a color filter array panel for the LCD according to the first embodiment.
Figure 3:
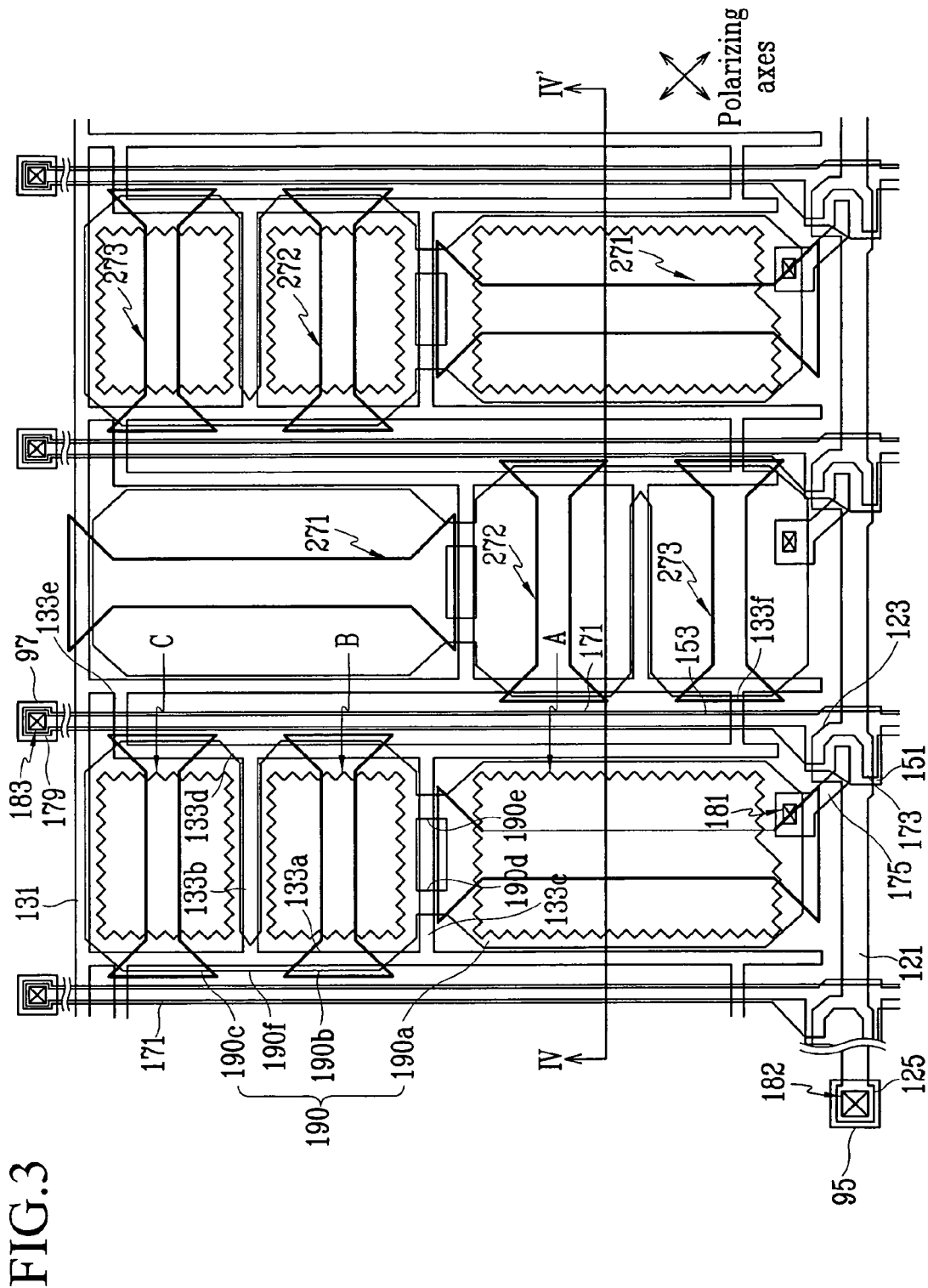
FIG. 3 is a front layout view of cutouts of a pixel electrode and a common electrode of the LCD according to the first embodiment.
Figure 4:
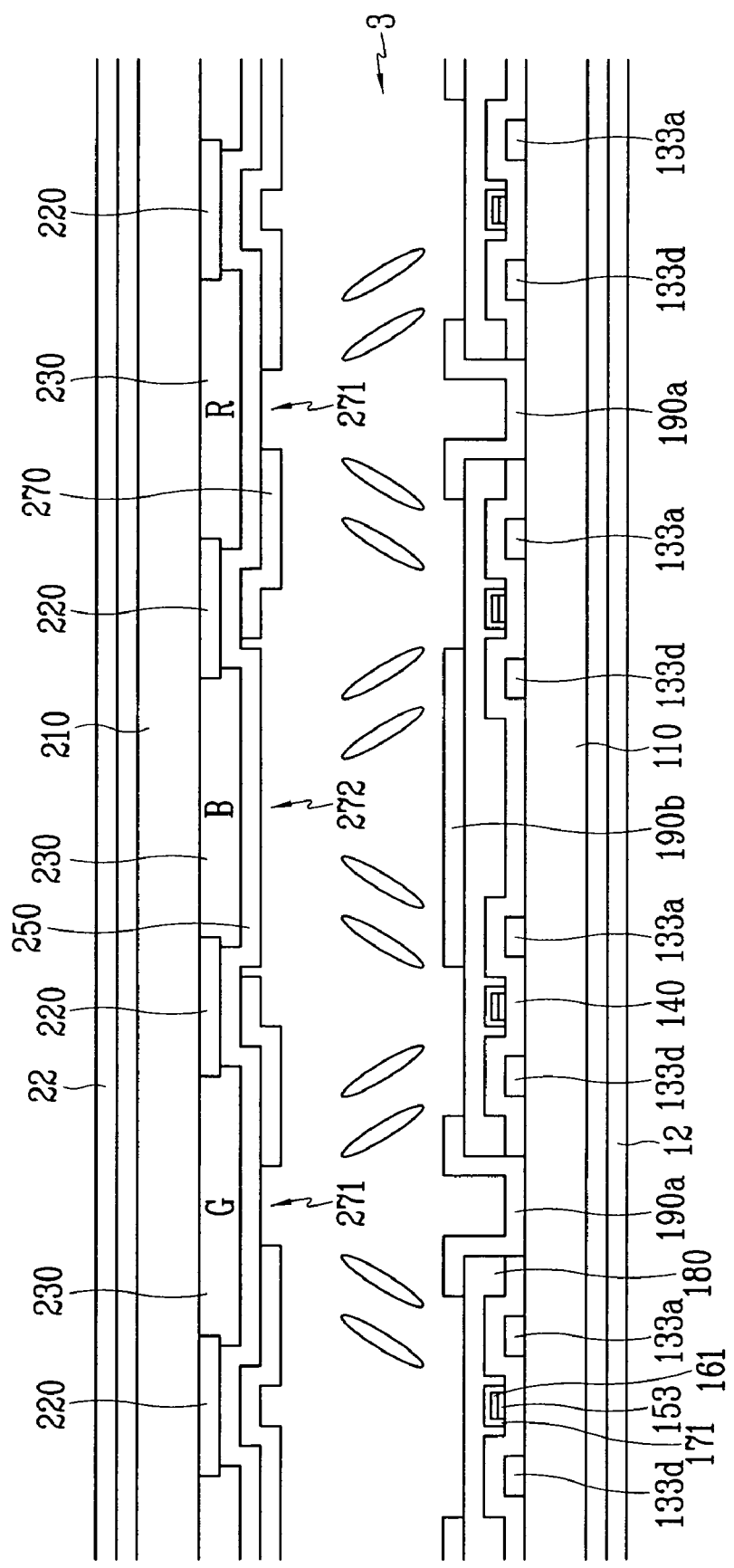
FIG. 4 is a sectional view of FIG. 3 taken along the line IV-IV'.

FIG. 1 is a layout view of a TFT array panel for an LCD according to a first embodiment of the present invention, and FIG. 2 is a layout view of a color filter array panel for an LCD according to a first embodiment of the present invention. FIG. 3 is a layout view showing arrangement of cutouts of a pixel electrode and a common electrode for an LCD according to a first embodiment of the present invention, and FIG. 4 is a sectional view of the LCD shown in FIG. 3 taken along the line IV-IV'.

A TFT array panel for an LCD according to a first embodiment of the present invention is described with reference to FIGS. 1 and 4.

A plurality of gate lines 121 extending in a transverse direction and a plurality of storage electrode lines 131 extending parallel to the gate lines 121 are formed on an insulating substrate 110 preferably made of transparent glass. A plurality of gate electrodes 123 are protruded from the gate lines 121 and a gate pad 125 is provided at one end of each gate line 121.

A plurality of sets of first to fourth storage electrodes 133a, 133b, 133c and 133d as well as a plurality of storage electrode connectors 133e and 133f are connected to each storage electrode line 131. The first storage electrode 133a is directly connected to the storage electrode line 131 and extends in a longitudinal direction. The second storage electrode 133b and the third storage electrode 133c are connected to the first storage electrode 133a and extend in the transverse direction. The fourth storage electrode 133d is connected to the second and the third storage electrodes 133b and 133c and extends in the longitudinal direction. The storage electrode connectors 133e and 133f interconnect the fourth storage electrode 133d and the first storage electrode 133a in an adjacent pixel area.

The gate wire 121, 123 and 125 and the storage electrode wire 131 and 133a to 133f are made of a conductive material such as Al, Al alloy, Cr, Cr alloy, Mo, Mo alloy, chromium nitride and molybdenum nitride and have a thickness of 1,000-3,500 Å.

The gate wire 121, 123 and 125 and the storage electrode wire 131 and 133a to 133f may have a multiple-layered structure. In this case, it is preferable that at least one layer is made of a metal with low resistivity.

A gate insulating layer 140 is formed on the gate wire 121, 123 and 125 and the storage electrode wire 131 and 133a to 133f. The gate insulating layer 140 is made of an insulating material such as silicon nitride or silicon oxide and has a thickness of 3,500-4,500 Å.

An amorphous silicon layer 151 and 153 is formed on the gate insulating layer 140 opposite the gate electrodes 123. The amorphous silicon layer includes a plurality of data line portions 153 and a plurality of channel portions 151 and has a thickness of 800-1,500 Å.

An ohmic contact layer 161, 163 and 165 preferably made of amorphous silicon heavily doped with n-type impurity such as phosphorous P is formed on the amorphous silicon layer 151 and 153. The ohmic contact layer 161, 163 and 165 bears a thickness of 500-800 Å.

A plurality of source and drain electrodes 173 and 175 are formed on the ohmic contact layer 163 and 165. A plurality of data lines 171 extending in the longitudinal direction are formed on the data line portion 161 of the ohmic contact layer. The source electrode 173 is connected to the data line 171. A plurality of data pads 179 are provided at one ends of the respective data lines 171. The data wire 171, 173, 175 and 179 is made of a conductive material such as Al, Al alloy, Cr, Cr alloy, Mo, Mo alloy, chromium nitride and molybdenum nitride and has a thickness of 1,500-3,500 Å.

The data wire 171, 173 and 175 may have a multiple-layered structure. In this case, it is preferable that at least one layer is made of a metal with low resistivity.

A protective layer 180 is formed on the data wire 171, 173 and 175 and has a plurality of contact holes 181 exposing the drain electrodes 175. The protective layer 180 is made of an insulating material such as silicon nitride or silicon oxide and has a thickness of 1,500-2,500 Å. Furthermore, the protective layer 180 may be made of an organic insulating layer, or a low dielectric CVD layer. The low dielectric CVD layer may be made of a-Si:C:O or a-Si:O:F, which is deposited by plasma enhanced chemical vapor deposition (PECVD).

The protective layer 180 and the gate insulating layer 140 have openings A, B and C with saw-toothed edges. The openings A, B and C are formed by removing portions of the protective layer 180 and the gate insulating layer 140 by etching.

A plurality of pixel electrodes 190 connected to the drain electrodes 175 through the contact holes 181 are formed on the protective layer 180. The pixel electrodes 190 are made of a transparent conductive material such as indium tin oxide (ITO) or indium zinc oxide (IZO).

The pixel electrode 190 includes first to third partitions 190a, 190b and 190c, which are connected to each other via a plurality of connectors 190d, 190e and 190f. The first partition 190a is placed at an upper half part or a lower half part of a pixel area defined by intersections of two gate lines 121 and two data lines 171 and has a shape of a rectangle with four chamfered corners. The second and the third partitions 190b and 190c are placed at the other half part of the pixel area and have shapes of rectangles with chamfered corners. The second partition 190b is connected to the first partition 190a through the first and the second connectors 190d and 190e, and the third partition 190c is connected to the second partition 190b through the third connector 190f. The second storage electrode 133b is disposed between the first and the second partitions 190a and 190b, and the third storage electrode 133c is disposed between the second and the third partitions 190b and 190c. The first and the fourth storage electrodes 133a and 133d are disposed between the pixel electrode 190 and the data line 171. Edges of the first partition 190a extending parallel to the data lines 171 are longer than its edges extending parallel to the gate lines 121, while edges of the second and the third partitions 190b and 190c extending parallel to the data line 171 are shorter than their edges extending parallel to the gate line 121. The second and the third partitions 190b and 190c overlap the first and the fourth storage electrodes 133a and 133d, while the first partition 190a does not overlap the first and the fourth storage electrodes 133a and 133d.

The partitions 190a, 190b and 190c of the pixel electrodes 190 in red and green pixel areas overlap the openings A, B and C provided in the protective layer 180 and the gate insulating layer 140 such that the partitions 190a, 190b and 190c contact the substrate 110 in the openings A, B and C. The openings A, B and C are not provided for the blue pixel area such that the pixel electrode 190 on the blue pixel area is placed on the protective layer 180.

The neighboring pixel electrodes 190 across the data line 171 have reversed shapes along the longitudinal direction. That is, referring to the figures, the first partition 190a in the first pixel area is placed in the lower half part, while that in the second pixel area is placed in the upper half part. Consequently, the second and the third storage electrodes 133b and 133c in the two pixel areas across the data line 171 are reversed in their positions. However, the TFTs of the pixel areas in a row are connected to the same gate line 121. Therefore, the drain electrode 175 of the TFT in the first pixel area is connected to the first partition 190a, while that in the second pixel area is connected to the third partition 190c.

Meanwhile, the electric potential applied to a common electrode in a color filter array panel is also applied to the storage electrode line 131, the storage electrodes 133a to 133d, and the storage electrode connectors 133e and 133f.

As described above, a storage line or a storage electrode receiving the common electric potential and disposed between the data line and the pixel electrode or between the gate line and the pixel electrode prevents the potentials of the data line and the gate line from affecting the electric field of the pixel area, thereby forming stable domains.

In this way, the pixel electrodes 190 in the red and green pixel areas are formed directly on the insulating substrate 110, while the pixel electrode 190 in the blue pixel area is formed on a lamination of the gate insulating layer 140 and the protective layer 180. Therefore, the pixel electrodes 190 in the red and the green pixel areas and the pixel electrode 190 in the blue pixel area have height difference by the thickness of the protective layer 180 and the gate insulating layer 140, i.e., by about 0.5-0.7 microns.

This structure makes a step of about 0.5-0.7 microns between the blue pixel area and the red and green pixel areas.

Meanwhile, the boundaries of the openings A, B and C have saw-toothed edges making angle of about 45 degrees with the gate lines 121 and the data lines 171. These edges are parallel or perpendicular to the polarizing axes. This prevents the light leakage at the boundaries of the openings A, B and C.

A color filter array panel for an LCD according to the first embodiment will be now described with reference to FIGS. 2 to 4.

A black matrix 220 preferably including double layers of Cr/CrOx is formed on a transparent glass substrate 210 and defines pixel areas. A plurality of red, green and blue color filters 230R, 230G and 230B are formed in the respective pixel areas. An overcoat 250 covers and protects the color filters 230R, 230G and 230B, and a common electrode 270 preferably made of a transparent conductive material is formed on the overcoat 250. The common electrode 270 has a plurality of sets of first to third cutouts 271 to 273. The first cutout 271 bisects the upper or lower half of the pixel area into two portions arranged in the transverse direction. The second and the third cutouts 272 and 273 trisect the other upper or lower half of the pixel area into three portions arranged in the longitudinal direction. Both ends of the each cutout 271 to 273 are gradually enlarged to form an isosceles triangle. The first to the third cutouts 271 to 273 in two pixel areas adjacent in the transverse direction are reversed in their positions in the longitudinal direction.

Meanwhile, the black matrix 220 may be made of an organic insulating material containing a black pigment, instead of the metal such as Cr.

After the TFT array panel shown in FIG. 1 and the color filter array panel shown in FIG. 2 are aligned and assembled, a liquid crystal material 3 is injected between the panels such that the long axes of the liquid crystal molecules are aligned perpendicular to the substrates 110 and 210. An LCD according to the first embodiment is then prepared by attaching two polarizing plates 12 and 22 to outer surfaces of the substrates 110 and 210 such that the polarizing axes thereof cross each other. The polarizing axes of the polarizing plates 12 and 22 make angle of about 45 degrees with respect to the gate lines 121 or the data lines 171.

The substrates 110 and 210 are aligned such that the partitions 190a to 190c of the pixel electrode 190 overlap the first to the third cutouts 271 to 273 of the common electrode 270 to partition the pixel area into a plurality of subareas. Each subarea has two long edges and two short edges and is elongated parallel to the gate lines 121 or the data lines 171.

Meanwhile, each partition 190a to 190c of the pixel electrode 190 has two long edges and two short edges. The long edges of each partition extend parallel to the data lines 171 or the gate lines 121 and make angle of about 45 degrees with the polarizing axes of the polarizing plates.

The storage electrode line 131 or the storage electrodes 133a to 133d are disposed between the data lines 171 or the gate lines 121 and the long edges of the partition adjacent thereto. Meanwhile, it is preferable that the storage electrode wire is not assigned near the short edges of the partition, or spaced apart therefrom by at least three microns. Otherwise, the storage electrode wire is preferably fully covered by the pixel electrode 190. This is because the electric potential of the data lines 171 or the gate lines 121 close to the long edges of the partitions obstructs the domain formation. On the contrary, the electric potential of the data line 171 or the gate line 121 close to the short edges of the partition make a contribution to the domain formation.

As shown in FIG. 3, the boundaries of the openings A, B and C in the protective layer 180 and the gate insulating layer 140 have saw-toothed edges parallel or perpendicular to the polarizing axes. This structure reduces the light leakage at the boundaries of the openings A, B and C and this will be described in detail.

The liquid crystal molecules near the steps formed at the boundaries of the openings A, B and C are out of order. That is, the long axes of the liquid crystal molecules are not aligned perpendicular to the substrates 110 and 210 but inclined thereto even in the absence of the electric field and this may change the polarization of light to result in the light leakage. However, if the tilt directions of the liquid crystal molecule are parallel or perpendicular to the polarizing axes, the light polarization is not affected by the orientations of the liquid crystal molecules. Meanwhile, the steps near the boundaries of the openings A, B and C tilt the liquid crystal molecules positioned close thereto to be perpendicular to the boundaries. Consequently, the long axes of the liquid crystal molecules become parallel or perpendicular to the polarizing axes. In other words, although the liquid crystal molecules positioned close to the boundaries of the openings A, B and C are oriented oblique to the substrates due to the stepped difference, the polarization of the light is not affected since the tilt directions are parallel or perpendicular to the polarizing axes. Therefore, the increase in the light leakage due to the openings A, B and C can be prevented.

A second embodiment of the present invention is described now.

Figure 5:
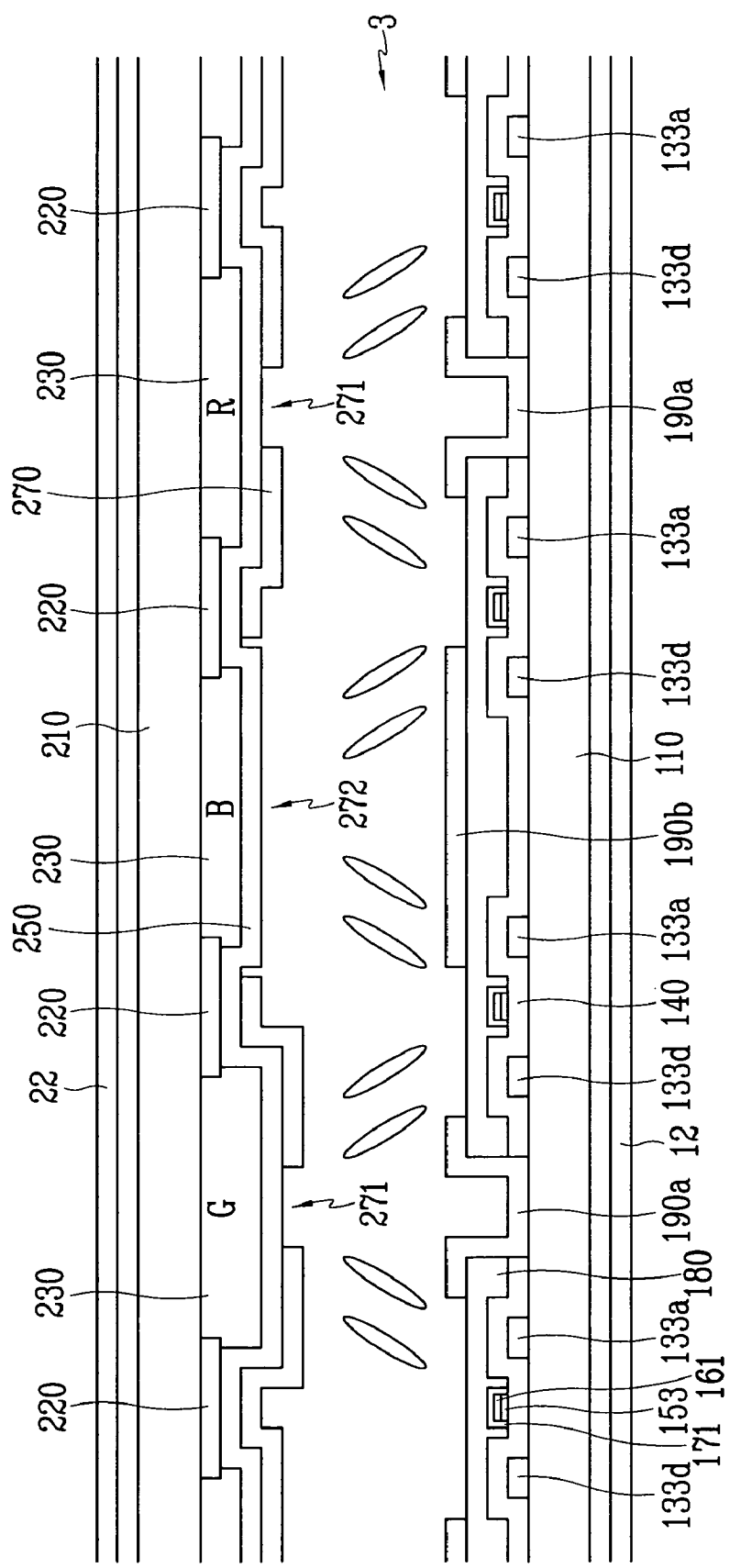
FIG. 5 is a sectional view of an LCD according to a second embodiment of the present invention taken along the line corresponding to the line IV-IV' shown in FIG. 3.

FIG. 5 is a sectional view of an exemplary LCD according to a second embodiment of the present invention taken along the line IV-IV' in FIG. 3. Green color filters G of the LCD have thickness larger than red color filters R and blue color filters B. This enable to satisfy a color correction condition expressed in Equation 2.

For instance, the thickness of the green color filter G is larger than that of the other two color filters R and B by about 0.1-0.2 microns. The step between the green color filter G and the red and the blue color filters R and B has about 0.1 to 0.2 microns.

The assembly of the color filter array panel and the TFT array panel according to the first embodiment with a gap therebetween provides different cell gaps for the respective pixel areas.

The B pixel area in the assembly protrudes toward the liquid crystal layer by about 0.5-0.7 microns compared with the R and G pixel areas, and the green color filter G corresponding to the C pixel area protrudes toward the liquid crystal layer by about 0.1-0.2 microns compared with the red and blue color filters R and B corresponding to the R and B pixel areas.

Therefore, the cell gaps of the respective pixel areas satisfy Equation 2.

As described above, the present invention provides individual cell gaps for the respective pixel areas to form multi cell gaps. The multi cell gaps enable to control the light transmittance of the respective pixel areas, thereby realizing the desired color correction.

Furthermore, the saw-toothed shapes or the zigzag shapes of the boundaries of the openings A, B and C reduce the light leakage near the boundaries.

It is preferable that a plurality of spacers, particularly in pillar shapes, are provided between the TFT array panel and the color filter array panel to maintain the uniform distance therebetween. The spacers are preferably positioned at the areas covered by the black matrix 110.

A method of fabricating the TFT array panel will be now described with reference to FIGS. 6A to 6E as well as FIG. 1.

FIGS. 6A to 6E are sectional views of the TFT array panel shown in FIG. 1 according to the first and the second embodiments taking along the lines VI-VI', VI'-VI" and VI"-VI"', which sequentially illustrate the intermediate steps of fabricating the TFT array panel.

Figure 6A:
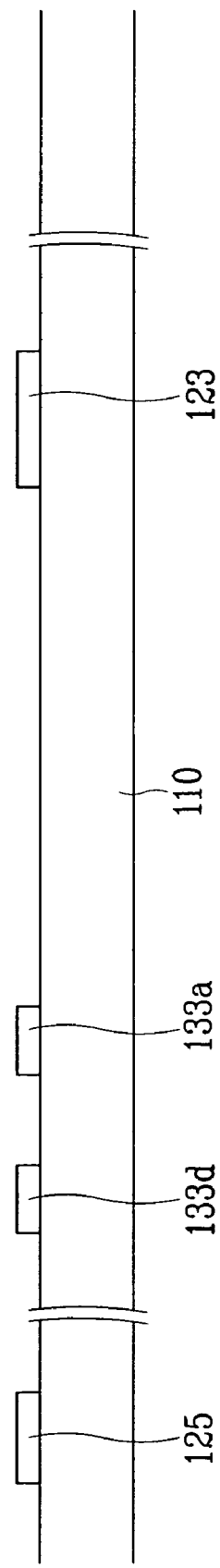

As shown in FIG. 6A, a gate metal layer is deposited on an insulating substrate 110 and patterned by photo etching to form a gate wire. The gate wire includes a plurality of gate lines 121, a plurality of gate electrodes 123, and a plurality of gate pads 125.

Figure 6B:
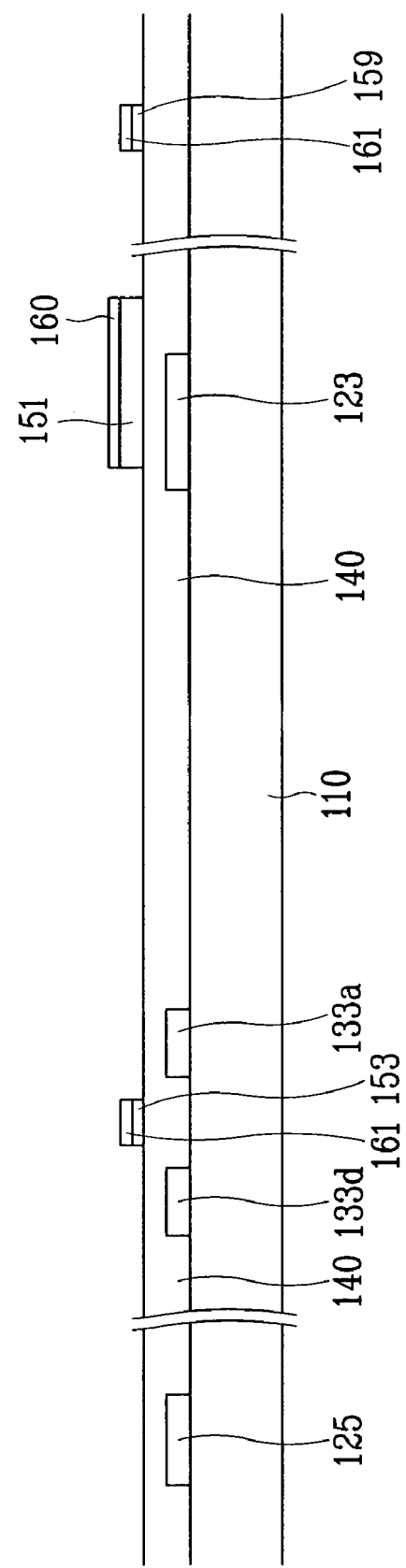

Thereafter, as shown in FIG. 6B, a gate insulating layer 140 made of an insulating material such as silicon nitride is deposited on the insulating substrate 110 such that it covers the gate wire 121, 123 and 125.

An amorphous silicon layer and a conductive-impurity-doped amorphous silicon layer are sequentially deposited on the gate insulating layer 140, and patterned by photo etching to form an amorphous silicon layer 151 and 153 and an ohmic contact layer 160 and 161.

As shown in FIG. 6C, a data metal layer is deposited on the entire surface of the substrate, and patterned by photo etching to form a data wire. The data wire includes a plurality of data lines 171, a plurality of source electrodes 173, and a plurality of drain electrodes 175. The data lines 171 intersect the gate lines 121 to define a plurality of pixel areas including R pixel areas, G pixel areas, and B pixel areas.

The ohmic contact layer 161 and 160 is etched using the source and the drain electrodes 173 and 175 as a mask such that it is divided into portions 163 contacting the source electrodes 173 and portions 165 contacting the drain electrodes 175.

Figure 6D:
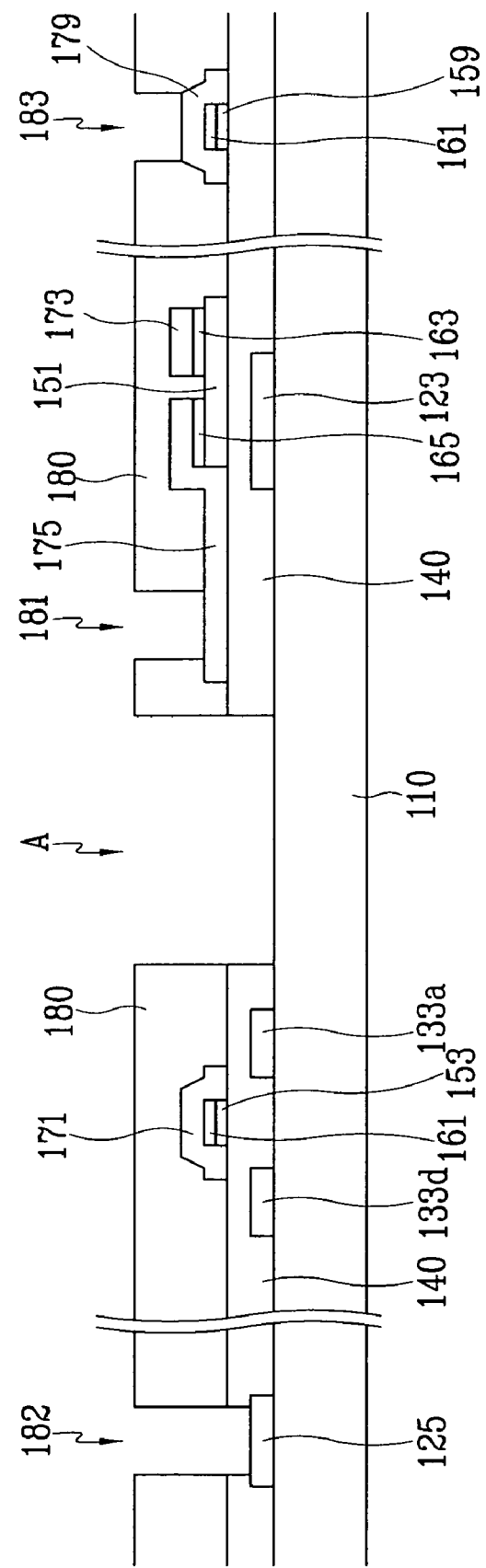

As shown in FIG. 6D, a protective layer 180 preferably made of silicon nitride or silicon oxide is formed on the entire surface of the substrate provided with the data wire 171, 173, 175 and 179 and the semiconductor pattern 151 and 153.

The protective layer 180 and the gate insulating layer 140 are patterned by photo etching to form a plurality of contact holes 181, 182 and 183 respectively exposing the drain electrodes 175, the gate pads 125 and the data pads 179, and a plurality of openings A, B and C exposing the insulating substrate 110 in the R and G pixel areas.

Figure 6E:
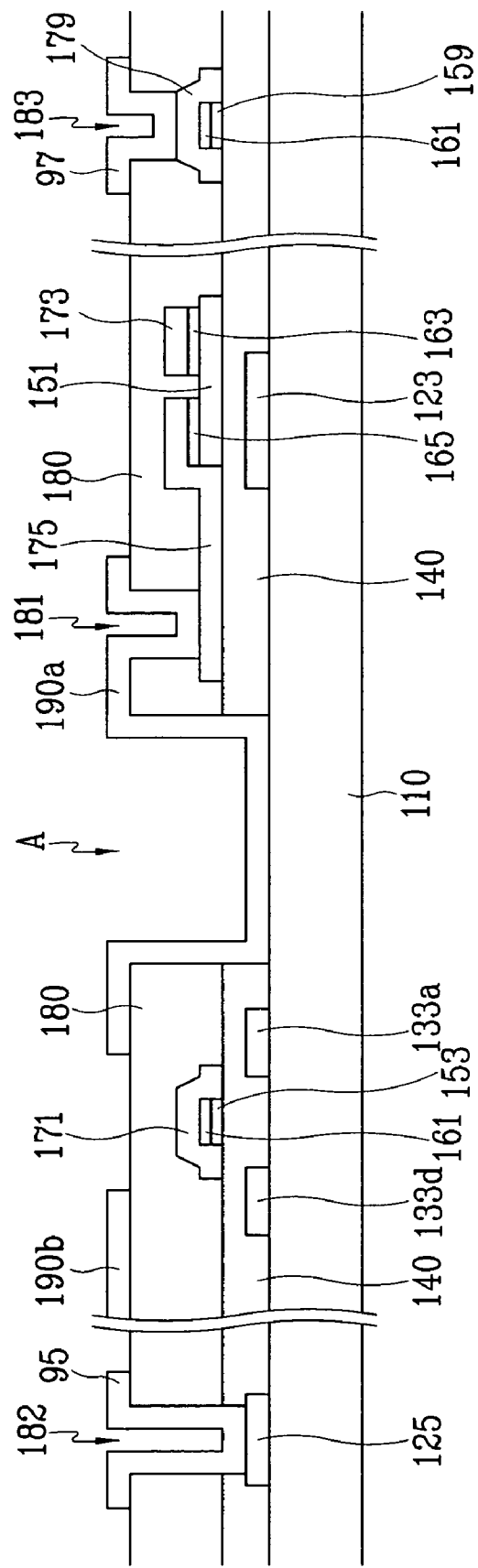

As shown in FIG. 6E, a transparent conductive layer made of ITO or IZO is deposited on the entire surface of the substrate, and patterned by photo etching to form a plurality of pixel electrodes 190 in the respective pixel areas. The pixel electrodes 190 are connected to the drain electrodes 175 through the contact holes 181. In this process, a plurality of subsidiary gate pads 95 and a plurality of subsidiary data pads 97 are formed together with the pixel electrodes 190 such that they cover the gate pads 125 and the data pads 179, respectively.

The color filter array panel of the LCD according to the first embodiment is fabricated by the usual process.

However, the second embodiment forms green color filters G to be thicker than red and blue color filters R and B.

That is, a black matrix 220 is formed on a top substrate 210, and a plurality of red, green and blue color filters R, G and B are sequentially formed thereon as shown in FIG. 5. The color filters may be formed by sequentially repeating the steps of coating one of red, green and blue color resins on the substrate and performing selective light exposure and development. The green color resin coated on the substrate preferably has a relatively large thickness such that the green color filter G is thicker than the R and B color filters. An overcoat 250 is formed on the substrate to cover the entire surface of the substrate, and a common electrode 270 is formed thereon.

Figure 7:
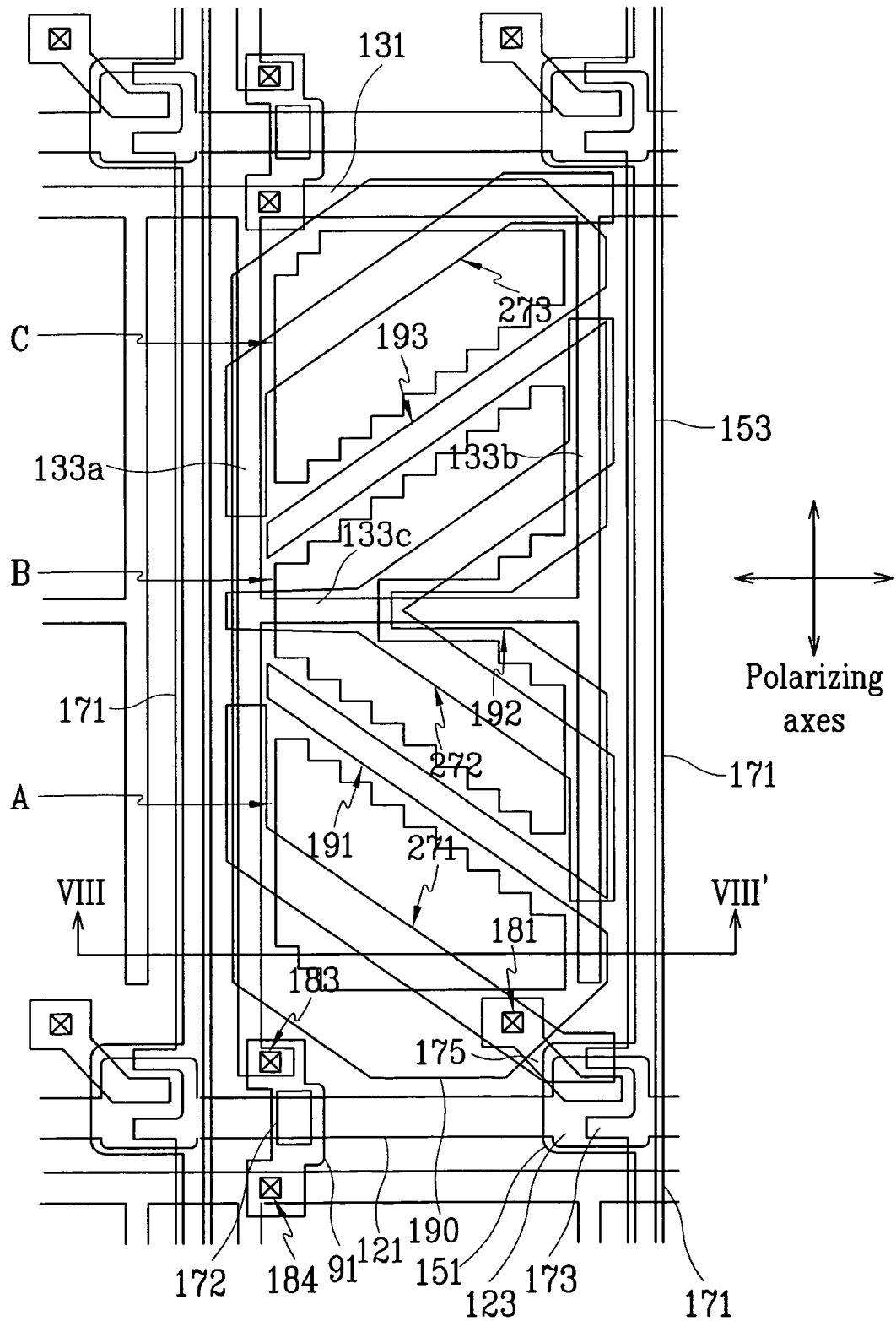
FIG. 7 is a layout view of a LCD according to a third embodiment of the present invention.
Figure 8:
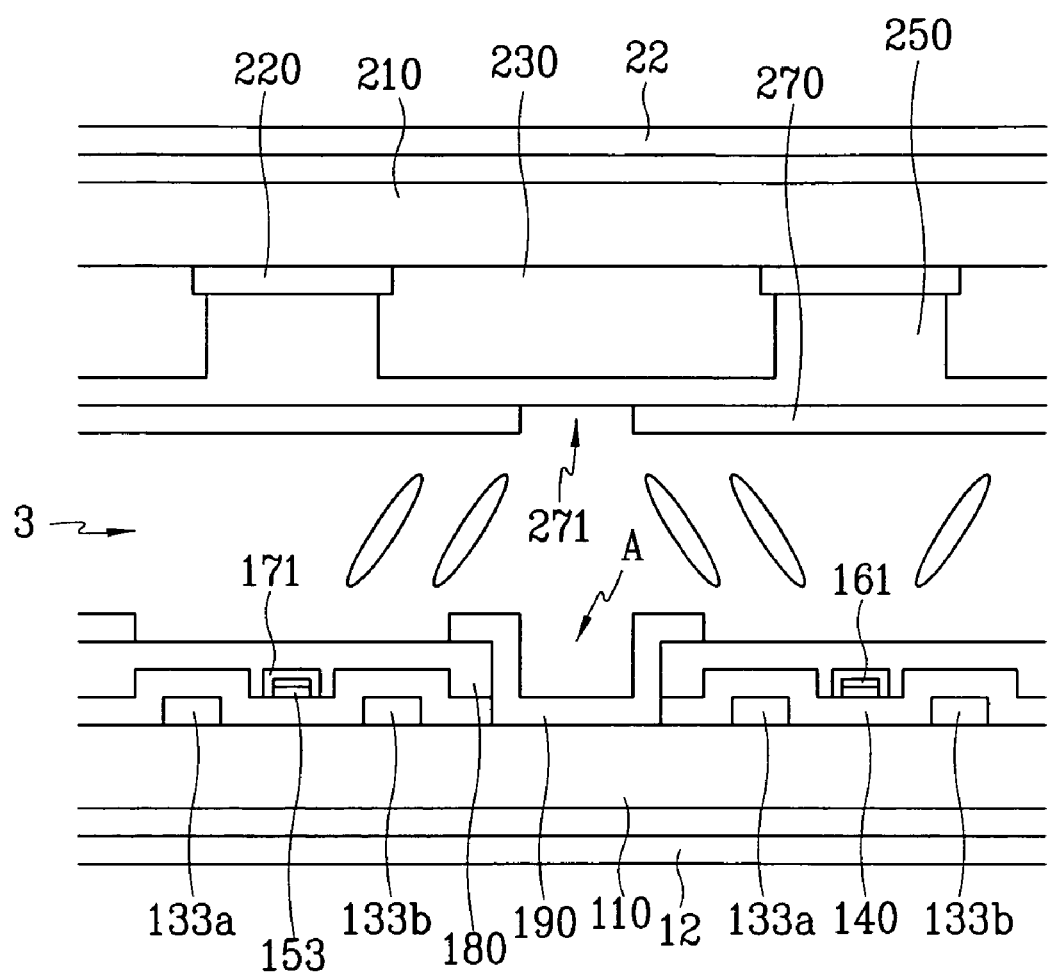
FIG. 8 is a cross sectional view of the LCD shown in FIG. 7 taken along the line VIII-VIII'.

FIG. 7 is a layout view of a LCD according to a third embodiment of the present invention, and FIG. 8 is a sectional view of the LCD shown in FIG. 7 taken along the line VIII-VIII'.

The LCD has a bottom substrate 110, a top substrate 210 facing the bottom substrate 110, and a liquid crystal layer 3 interposed between the bottom substrate 110 and the top substrate 210 such that liquid crystal molecules in the liquid crystal layer are aligned perpendicular to the substrates 210 and 220. The bottom and the top substrate 110 and 210 are made of an insulating material such as transparent glass.

A plurality of pixel electrodes 190 are formed on the bottom substrate 110. The pixel electrodes 190 is made of a transparent conductive material such as indium tin oxide (ITO) and indium zinc oxide (IZO) and have a plurality of apertures 191, 192 and 193. Each pixel electrode 190 is connected to a TFT to receive image signal voltages. The TFT is connected to a gate line 121 for carrying scanning signals and a data line 171 for carrying image signals to switch on/off the pixel electrode 190 responsive to the scanning signals. Furthermore, a bottom polarizing plate 12 is attached to outer surface of the bottom substrate 110. The pixel electrodes 190 of a reflective type LCD may not be made of a transparent material and the reflective type LCD does not require the bottom polarizing plate 12.

A black matrix 220 for preventing light leakage, a plurality of red, green and blue color filters 230 and a common electrode made of transparent material such ITO and IZO are formed on the top substrate 210. The common electrode 270 is provided with a plurality of sets of cutouts 271 to 273. The black matrix 220 may located on the cutouts 271 to 273 as well as the periphery of pixel areas for preventing light leakage due to the cutouts 271 to 273.

The LCD according to the third embodiment will be now described in more detail.

A plurality of gate lines 121 extending in a transverse direction are formed on the bottom insulating substrate 110. A plurality of gate electrodes 123 protrudes from the gate lines 121. A plurality of storage electrode lines 131 extending parallel to the gate lines 121 are formed on the insulating substrate 110. Each storage electrode line 131 is connected to a plurality of pairs of storage electrodes 133a and 133b extending in a longitudinal direction and connected to each other through a storage electrode 133c extending in the transverse direction. At least one additional storage electrode lines 131 may be provided. The gate lines 121, the gate electrodes 123, the storage electrode lines 131 and the storage electrodes 133a to 133c are made of a metal such as Al and Cr, and have a single-layered structure or a double-layered structure including sequentially-deposited Cr and Al layers. The gate wire and the storage wire may be made of various metals.

A gate insulating layer 140 preferably made of silicon nitride is formed on the gate lines 121, the storage electrode lines 131 and the storage electrodes 133a to 133c.

A plurality of data lines 171 extending in the longitudinal direction are formed on the gate insulating layer 140. A plurality of source electrodes 173 branched from each data line 171 and a plurality of drain electrodes 175 positioned close to the source electrodes 173 are formed. A plurality of bridge metal pieces 172 overlapping the gate lines 121 are formed on the gate insulating layer 140. Like the gate wire, the data lines 171, the source electrodes 173 and the drain electrodes 175 are preferably made of Cr or Al, and may also have a single-layered structure or a double-layered structure.

A plurality of channel portions 151 of an amorphous silicon layer used as channels of TFTs are formed under the source and the drain electrodes 173 and 175. A plurality of data portions 153 of the amorphous silicon layer are formed under the data line 171 such that they interconnect the channel portions 151 of the amorphous silicon layer in the longitudinal direction. A plurality of ohmic contacts (not shown) are formed on the channel portions 151 of the amorphous silicon layer for reducing the contact resistance between the source and drain electrodes 173 and 175 and the channel portions 151 of the amorphous silicon layer. The ohmic contacts are made of amorphous silicon heavily doped with n-type impurity.

A protective layer 180 preferably made of an inorganic insulating material such as silicon nitride or an organic material such as resin is formed on the data lines 171. The protective layer 180 is provided with a plurality of contact holes 181 exposing the drain electrodes 175.

The protective layer 180 and the gate insulating layer 140 are provided with a plurality of openings A, B and C having saw-toothed edges. The openings A, B and C are formed by removing the protective layer 180 and the gate insulating layer 140 by etching.

A plurality of pixel electrodes 190 having a plurality of apertures 191-193 are formed on the protective layer 180. The pixel electrodes 190 are made of a transparent conductive material such as ITO and IZO, or an opaque conductive material exhibiting excellent light reflectance such as Al. The apertures 191 to 193 of the pixel electrodes 190 include a transverse aperture 192 extending in the transverse direction and bisecting the pixel electrode 190 into two portions arranged in the longitudinal direction and a plurality of oblique apertures 191 and 193 located in upper and lower halves of the pixel electrode 190 and extending obliquely. The apertures 191 and 193 placed in the upper and lower halves of the pixel electrode 190 are perpendicular to each other. This is to uniformly distribute the fringe fields in four directions.

The pixel electrodes 190 in the red and the green pixel areas overlap the openings A, B and C of the protective layer 180 and the gate insulating layer 140 such that they contact the substrate 110 in the openings A, B and C. The openings A, B and C are not provided in the blue pixel area such that the pixel electrode 190 in the blue pixel area is placed on the protective layer 180.

The apertures 191 to 193 of the two pixel electrodes 190 opposite each other with respect to the data line 171 have an inversion symmetry.

A plurality of storage connection bridges 91 are also formed on the protective layer 180 such that they interconnects the storage electrodes 133a and the storage electrode lines 131 across the gate line 121. The storage connection bridge 91 contacts the storage electrode 133a and the storage electrode line 131 through the contact holes 183 and 184 formed in the protective layer 180 and the gate insulating layer 140. The storage connection bridge 91 overlaps the bridge piece 172. The storage connection bridge 91 electrically interconnects the storage wire components on the bottom substrate 110. If needed, the storage wire may be used to repair the defects of the gate lines 121 or the data lines 171. The bridge pieces 172 are provided for assisting the electrical connection between the gate lines 121 and the storage connection bridges 91 formed by laser shorting for the repair.

A black matrix 220 for preventing light leakage is formed on the top insulating substrate 210. A plurality of red, green and blue color filters 230 are formed on the black matrix 220. A common electrode 270 having a plurality of cutouts 271, 272 and 273 is formed on the color filters 230. The common electrode 270 is made of a transparent conductive material such as ITO and IZO.

The oblique apertures 191 and 193 of the pixel electrode 190 are interposed between the cutouts 271 to 273 of the common electrode 270, which include oblique portions extending parallel to the oblique apertures 191 and 193, and bent portions overlapping the edges of the pixel electrode 190. The bent portions are classified into transverse bent portions and longitudinal bent portions.

The cutouts 271 to 273 of the common electrode 270 in the two pixel areas opposite each other with respect to the data line 171 have inversion symmetry.

The LCD according to this embodiment is prepared by aligning and assembling the TFT array panel and the color filter array panel and injecting a liquid crystal material into a gap between the two panels such that the liquid crystal material is subject to vertical alignment. The apertures 191 to 193 of the pixel electrode 190 and the cutouts 271 to 273 of the common electrode 270 in the assembly of the TFT array panel and the color filter array panel aligned with each other partition a pixel area into a plurality of domains. The domains are classified into four classes depending upon the average long axial directions of the liquid crystal molecules.

According to the above-described embodiments, the gate insulating layer 140 and the protective layer 180 are left in the B pixel area, while they are removed in the R and G pixel areas. However, upper part of the gate insulating layer 140 in the pixel areas may be removed such that lower part of the gate insulating layer 140 and the protective layer 180 are left in the B pixel area, and the gate insulating layer 140 and the protective layer 180 are all removed at the R and G pixel areas. Furthermore, the gate insulating layer 140 in the B pixel area may be all removed while leaving out the protective layer 180.

In order to obtain such a structure, the etching time for etching the amorphous silicon layer 151 and 153 and the ohmic contact layer 161, 163 and 165 is increased to over-etch upper part of the underlying gate insulating layer 140 or all of the gate insulating layer 140. The remaining process steps are performed as in the first and the second embodiments.

The arrangement of the cutouts of the pixel electrodes and the common electrode may be modified in various manners. Protrusions may be provided instead of the cutouts.

As described above, the inventive LCD differentiates the cell gaps for the respective pixel areas to separately control the light transmittance in the respective pixel areas, thereby realizing the desired color correction. Furthermore, the boundaries of the openings for controlling the cell gap have zigzag shapes, which prevent light leakage near the boundaries.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
   a first insulating substrate;
   a plurality of gate lines formed on the first insulting substrate;
   a gate insulating layer covering the gate line;
   a plurality of data lines formed on the gate insulating layer and intersecting the gate lines to define first to third pixel areas;
   a plurality of thin film transistors electrically connected to the gate lines and the data lines;
   a protective layer covering the thin film transistors and the data lines and having a plurality of contact holes exposing a plurality of drain electrodes of the thin film transistors;
   a plurality of pixel electrodes connected to the drain electrodes through the contact holes;
   a second insulating substrate facing the first insulating substrate;
   a black matrix having a plurality of openings formed on the second insulating substrate;
   red, green, and blue color filters each arranged within an opening of the black matrix and arranged on the second insulating substrate, wherein the red, green, and blue color filters face the first to third pixel areas; and
   a common electrode covering the red, green, and blue color filters and having a plurality of cutouts disposed on the red, green, and blue color filters,
   wherein the protective layer and the gate insulating layer have openings in the first and the second pixel areas,
   wherein the protective layer and the gate insulating layer do not have openings in the third pixel area,
   wherein the openings of the protective layer and gate insulation layer overlap the pixel electrodes, and
   wherein the green color filter that is arranged within an opening of the black matrix is thicker than both the red color filter arranged within an opening of the black matrix and the blue color filter arranged within an opening of the black matrix.

2. The liquid crystal display of claim 1, wherein a portion of the gate insulating layer overlapping a semiconductor pattern is thicker than other portions of the gate insulating layer.

3. The liquid crystal display of claim 1, wherein each of the plurality of pixel electrodes includes a plurality of partitions, and each of the openings of the gate insulating layer includes a plurality of sub-portions overlapping the partitions of the pixel electrodes.

4. The liquid crystal display of claim 1, wherein a cell gap D1 in the first pixel area, a cell gap D2 in the second pixel area, and a cell gap D3 in the third pixel area satisfy the relation: D1>D2>D3.

5. The liquid crystal display of claim 1, further comprising an overcoat formed between the common electrode and the color filters.

6. The liquid crystal display of claim 1, wherein the openings of the protective layer each have zigzag-shaped boundaries.

7. The liquid crystal display of claim 6, wherein the boundaries of the openings of the protective layer each form an angle of about 45 degrees or about 135 degrees with respect to the gate lines.

8. The liquid crystal display of claim 6, wherein the boundaries of the openings of the protective layer each form an angle of about 90 degrees with respect to the gate lines.

9. A method of manufacturing a liquid crystal display, comprising:
   forming a gate wire including a gate line and gate electrodes on a first insulating substrate;
   forming a semiconductor pattern on a gate insulating layer;
   forming a data wire including a data line defining a first, second, and third pixel area by crossing the gate line, and defining source electrodes and drain electrodes connected to the semiconductor pattern;
   forming a passivation layer covering the semiconductor pattern and the data wires;
   forming contact holes exposing the drain electrodes and openings in the first and second pixel areas of the gate insulating layer and the passivation layer;
   forming pixel electrodes connected to the drain electrodes through the contact holes;
   forming a black matrix having a plurality of openings on a second insulation substrate;
   forming red, green, and blue color filters each within an opening of the black matrix and arranged on the second insulating substrate, wherein the red, green, and blue color filters face the first to the third pixel areas;
   forming a common electrode on the red, green, and blue color filters, wherein the common electrode has a plurality of cutouts disposed on the red, green, and blue color filters; and
   assembling the first substrate and the second substrate,
   wherein the passivation layer and the gate insulating layer each have openings over the first and second pixel areas,
   wherein the passivation layer and the gate insulating layer do not have openings over the third pixel area,
   wherein the openings of the passivation layer and the gate insulating layer overlap the pixel electrodes, and
   wherein the green color filter that is arranged within an opening of the black matrix is thicker than both the red color filter arranged within an opening of the black matrix and the blue color filter arranged within an opening of the black matrix.

10. The liquid crystal display of claim 1, wherein the red color filter arranged within the opening of the black matrix is substantially equal in thickness to the blue color filter arranged within the opening of the black matrix.

11. The method of claim 9, wherein the red color filter arranged within the opening of the black matrix is substantially equal in thickness to the blue color filter arranged within the opening of the black matrix.

* * * * *